(12) United States Patent
Roy et al.

(10) Patent No.: US 7,941,902 B1
(45) Date of Patent: May 17, 2011

(54) SAFETY BELT RELEASE MECHANISM

(76) Inventors: Julien Edwin Roy, Lafayette, LA (US); Douglas Clifton Cruthirds, Biloxi, MS (US)

( * ) Notice: Subject to any disclaimer, the term of this patent is extended or adjusted under 35 U.S.C. 154(b) by 0 days.

(21) Appl. No.: 12/907,747

(22) Filed: Oct. 19, 2010

Related U.S. Application Data

(60) Provisional application No. 61/397,274, filed on Jun. 10, 2010.

(51) Int. Cl.
*A44B 11/25* (2006.01)
(52) U.S. Cl. ................ 24/602; 24/603; 24/652
(58) Field of Classification Search .......... 24/602, 24/603, 656, 652; 280/801, 808, 801.2; 297/468, 297/483, 484
See application file for complete search history.

(56) References Cited

U.S. PATENT DOCUMENTS

| | | | |
|---|---|---|---|
| 3,314,088 A | 4/1967 | Nordhaus et al. | |
| 3,500,510 A | 3/1970 | Gaione | |
| 3,581,352 A | 6/1971 | Lavin | |
| 4,014,080 A * | 3/1977 | Caradec | 24/602 |
| 4,488,691 A | 12/1984 | Lorch | |
| 4,589,172 A * | 5/1986 | Hoenigs et al. | 24/602 |
| 4,738,413 A | 4/1988 | Spinosa et al. | |
| 5,165,498 A | 11/1992 | Garboli et al. | |
| 5,243,710 A * | 9/1993 | Craycroft | 2/312 |
| 5,765,660 A | 6/1998 | Ambrosi | |
| 5,857,246 A | 1/1999 | Becnel | |
| 6,123,166 A | 9/2000 | Verellen | |
| 6,930,611 B1 | 8/2005 | Van Druff et al. | |
| 7,201,248 B1 | 4/2007 | Shaw | |
| 7,717,216 B2 * | 5/2010 | Van Rooyen | 180/268 |
| 2008/0116681 A1 | 5/2008 | Van Rooyen | |

OTHER PUBLICATIONS

Website, http://www.martin-baker.com/products/Restraint-Systems.aspx, Martin-Baker Water Activated Release System, two sheets printed from the internet on Sep. 2, 2010.

\* cited by examiner

*Primary Examiner* — James R Brittain
(74) *Attorney, Agent, or Firm* — Richard C. Litman

(57) ABSTRACT

The safety belt release mechanism includes a sensor component and a belt release component. The sensor component is installed at a low point within the vehicle. The sensor component contains a water-soluble material that retains a spring in its compressed state so long as the water-soluble material is dry. If the vehicle is immersed in water, the water-soluble material dissolves, releasing the spring. The spring drives a pin into the end of a pressurized gas (e.g., $CO_2$) cartridge, releasing the gas therein. The gas passes through a tube to the belt release component installed upon a belt latch mechanism to drive a pin from an engaged position in the latch to release the latch. While one such assembly is disclosed herein, it is most preferred that one such assembly be installed along each safety belt assembly of the vehicle.

16 Claims, 3 Drawing Sheets

US 7,941,902 B1

SAFETY BELT RELEASE MECHANISM

CROSS-REFERENCE TO RELATED APPLICATION

This application claims the benefit of U.S. Provisional Patent Application Ser. No. 61/397,274, filed Jun. 10, 2010.

BACKGROUND OF THE INVENTION

1. Field of the Invention

The present invention relates generally to seat belt systems, and particularly to a safety belt release mechanism that is activated by immersion in water to release the occupants of a motor vehicle from their seats in the event the vehicle is submerged in a body of water.

2. Description of the Related Art

A number of tragic accidents have occurred over the years when motor vehicles have ended up at least partially submerged in a body of water. Such a situation may be due to the failure of a parking brake, a collision, or loss of control of the vehicle, among various potential causes. In many instances the vehicle is relatively undamaged and the occupants may be physically capable of escape, but their seat belt systems may be locked or there may be too much pressure on the belt to allow the occupant(s) to unlatch the latch(es).

Thus, a safety belt release mechanism solving the aforementioned problems is desired.

SUMMARY OF THE INVENTION

The safety belt release mechanism includes a sensor component and a belt release component. The sensor component is installed at some low point within the vehicle structure, and includes a water-soluble substance (e.g., bicarbonate of soda, etc.) that retains a spring in compression when the substance is dry. When the water-soluble material dissolves, the spring is released and drives a pin into a gas cartridge (e.g., carbon dioxide, $CO_2$) to release the pressurized gas within the cartridge.

The gas is transmitted under pressure through a flexible tube or line to the belt release component, which is secured to a belt latch assembly installed along the belt. The belt latch assembly to which the belt release component is installed is a separate latch assembly from the conventional manually operated latch, and is preferably located at some point adjacent one of the belt anchors in the vehicle.

If the vehicle becomes immersed in water, water enters the sensor unit to dissolve the water-soluble material therein so that the spring drives a pin into the penetrable seal of a pressurized gas cartridge (e.g., $CO_2$, etc.). The gas from the cartridge travels through a flexible line or tube to the belt release component and drives a pin from the latch assembly to release the belt portions.

Any number of such installations may be provided in a motor vehicle. At least one such installation is provided in the driver's seat belt to allow the driver (if capable) to assist any other occupants of the vehicle after release of the driver's belt. Most preferably, however, a separate sensor and belt release system is installed in each safety belt of the vehicle. A plurality of sensor units may be installed with each actuator, the sensors being disposed in different locations in the vehicle to assure belt release regardless of the orientation of the vehicle when it comes to rest in a body of water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The safety belt release mechanism 10 is designed for installation in the seat belt assembly of a motor vehicle. The mechanism 10 is automatically activated to separate two belt portions from one another in the event the device is immersed in water in order to free the occupant restrained by the belt assembly, as when the motor vehicle plunges into a body of water in the event of an accident.

Figure 1:
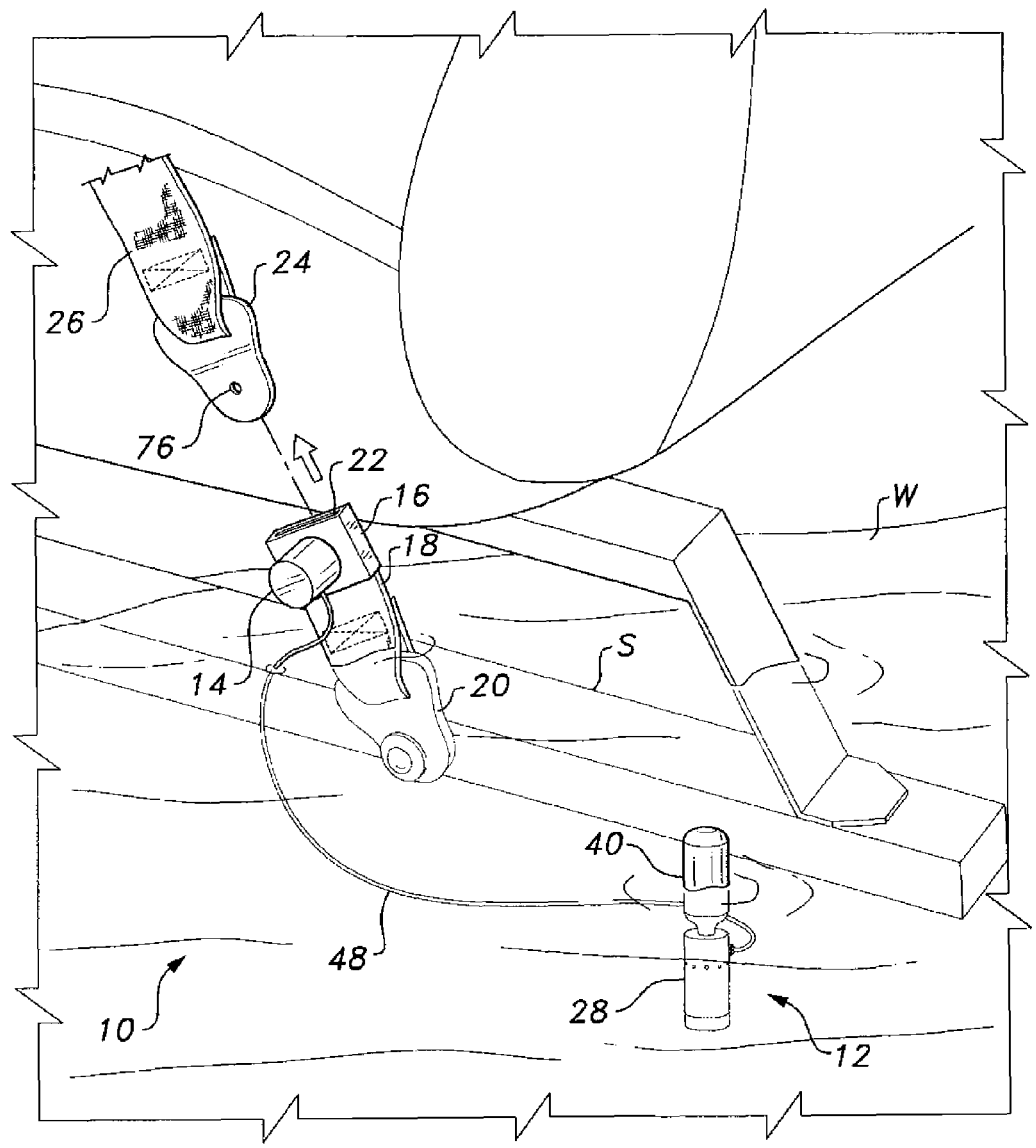
FIG. 1 is an environmental, perspective view of a safety belt release mechanism according to the present invention.

FIG. 1 of the drawings provides an environmental perspective view of the automated safety belt release mechanism 10 in an exemplary installation in a motor vehicle. The mechanism 10 is shown activated due to its immersion in water W in FIG. 1. The primary components of the system or mechanism 10 comprise a completely automated, water-activated sensor component 12 that is installed at some low point in the vehicle, and an actuator component 14 that is installed on the first latch component 16 of the belt assembly to communicate pneumatically with the sensor component 12. The first latch component 16 is, in turn, attached to a relatively short first or anchor belt portion 18, which extends from a safety belt anchor bracket 20 attached (e.g., bolted, etc.) to the seat support or other structure S of the vehicle. Alternatively, the first latch component 16 and its actuator component 14 may be constructed as an integral part of the safety belt anchor bracket 20, and the short first or anchor belt portion may be eliminated, if desired.

The first latch component 16 has a receptacle or slot 22 therein to accept the tongue or tab configuration of the second latch component 24. The second latch component 24 extends from the second safety belt component 26 and serves to connect the first and second belt components 18 and 26 directly to one another during normal operation.

Figure 2:
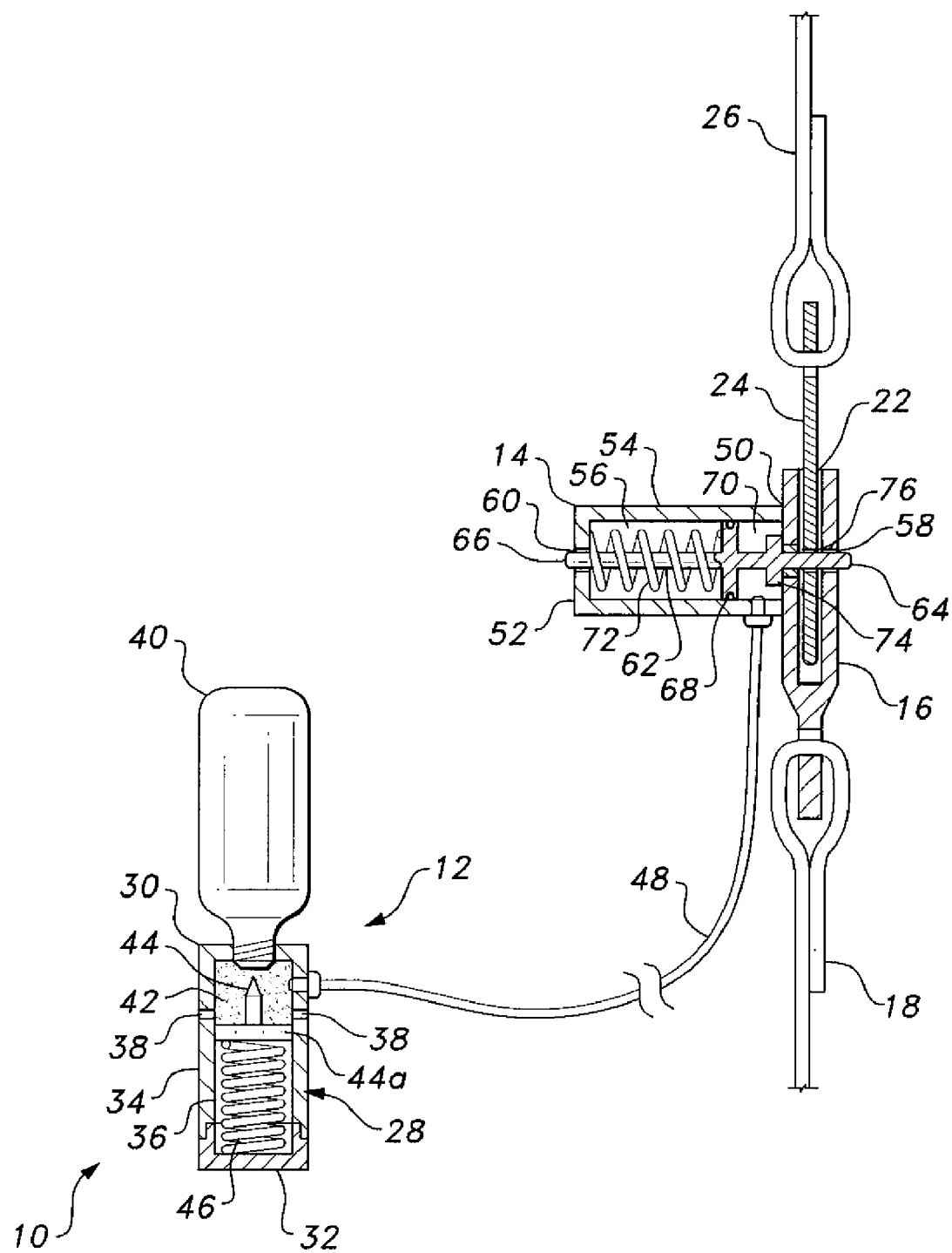
FIG. 2 is an elevation view in section of the mechanism of FIG. 1 in its armed state, illustrating various details thereof.
Figure 3:
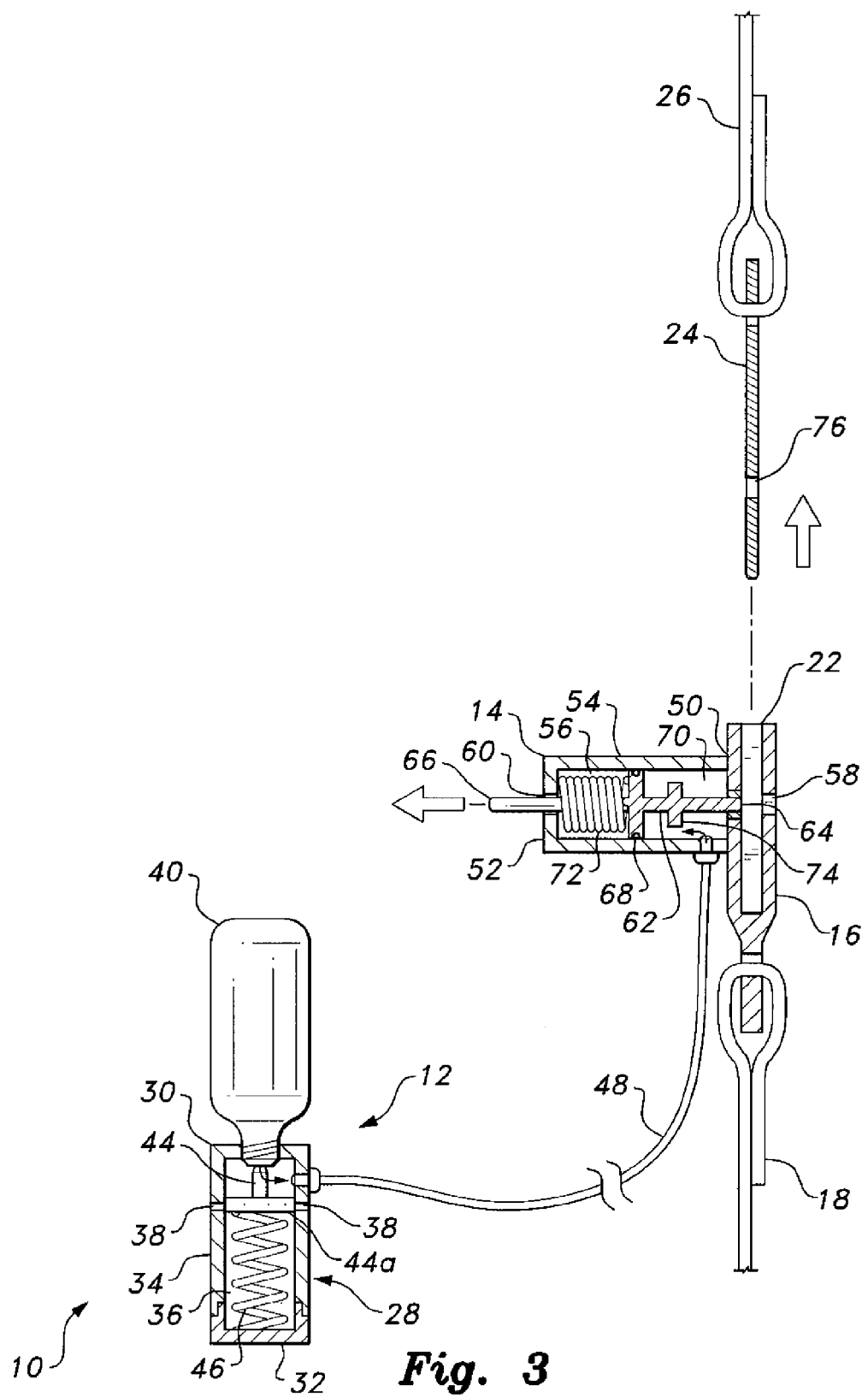
FIG. 3 is an elevation view in section of the mechanism of FIGS. 1 and 2 in its activated configuration, illustrating the operation thereof.

FIGS. 2 and 3 provide elevation views in section of the mechanism or system 10 in its normal, non-activated (connected) state and its activated (belt separation) state, respectively. The sensor unit or component 12 comprises a sensor body 28 having opposite first and second ends 30 and 32 and a wall 34 extending between the two ends 30, 32. The first and second ends 30, 32 and the wall 34 of the sensor body 28 define an interior chamber 36. At least one water passage 38 (and preferably a plurality of such passages) extends through the wall 34 to allow water to flow into the interior chamber 36 when the sensor unit 12 is submerged.

A pressurized gas cartridge 40 (e.g., a $CO_2$ cartridge) extends from the first end 30 of the sensor body 28. The neck of the cartridge 40 extends into the interior chamber 36, and defines a mouth closed by a penetrable seal. A water-soluble material 42 (e.g., bicarbonate of soda, etc.) is placed within the interior chamber 36, adjacent the first end 30 of the sensor body 28. A cartridge-penetrating pin 44 is installed within the interior chamber 36, and is oriented toward the penetrable seal of the pressurized gas cartridge 40. A compression spring 46 is installed within the interior chamber 36 adjacent the second end 32 of the sensor body 28, and is biased against the wider head 44a of the pin 44 to urge the pin toward the gas cartridge 40. However, the pin 44 is restricted from penetrating the end of the cartridge 40 by the water-soluble material 42, which is located within the interior chamber 36 between the pin 44 and the first end 30 of the sensor body 28. Thus, the pressurized gas cartridge 40 cannot be punctured to allow the gas to escape to the belt release actuator component 14 through the interconnecting flexible pneumatic tube or line 48 unless and until the water-soluble material is dissolved and/or washed from the interior chamber 36 of the sensor body 28.

Although it is not anticipated that the automatic safety belt release mechanism 10 would be reused in a motor vehicle, the mechanism 10 may be configured to allow it to be reworked for reuse, if so desired. It will be seen that the second end 32 of the sensor unit 12 may comprise a separable cap (e.g., a threaded cap) that may be removed and replaced. Also, the pressurized gas cartridge 40 may be removed from the opposite first end 30 of the sensor unit 12. Accordingly, the depleted cartridge 40 may be replaced with a fresh, fully charged cartridge, and the cap at the second end 32 of the sensor unit 12 may be removed to access the interior chamber 36 of the sensor unit 12. The spring 46 and the pin 44 are removed, and a fresh charge of water-soluble material is placed within the first end 30 of the sensor unit 12. The pin 44 and the spring 46 are then replaced in proper order, and the cap at the second end 32 is replaced to ready the sensor unit 12 for reuse.

The actuator unit 14 that extends from the first latch component 16 includes a latch attachment end 50, an opposite spring housing end 52, and a wall 54 extending therebetween. The latch attachment end 50 of the actuator 14 may comprise a portion of the surface of the first latch component 16, if so desired. The latch attachment end 50, spring housing end 52, and wall 54 define an interior chamber 56 within the actuator unit 14. The latch attachment end 50, i.e., the mating surface of the first latch component 16, has a latch pin passage 58 formed therethrough that continues concentrically through the opposite side of the first latch component 16. The opposite spring housing end 52 of the actuator unit 14 also has a corresponding latch pin passage 60 formed therethrough, the latch pin passages 58 and 60 being concentric with one another.

A latch pin 62 extends concentrically through the latch pin passages 58 and 60 of the actuator component or unit 14. The latch pin 62 has a latch-securing end 64 extending from the latch attachment end 50 of the actuator 14 when the mechanism 10 is armed, and an opposite guide end 66 extending from the spring housing end 52 of the actuator. The latch pin 62 further has a generally medially located sealing disc 68 disposed concentrically therearound, the sealing disc 68 defining a pneumatic chamber 70 between the disc 68 and the latch attachment end 50 of the actuator 14. A spring 72 is installed about the latch pin 62 between the spring housing end 52 of the actuator 14 and the sealing disc 68 of the latch pin 62. The spring 72 urges the sealing disc 68, and thus the latch pin 62, toward the first latch component 16 to extend the latch-securing end 64 of the latch pin 62 outwardly from the actuator 14. A stop 74 is disposed upon the latch pin 62 to limit the extension of the latch-securing end 64 of the latch pin 62.

The mechanism or system 10 is normally configured, as shown in FIG. 2, with the latch-securing end 64 of the latch pin 62 extended through the latch pin passage 58 of the first latch component 16 and the corresponding concentric latch pin passage 76 of the second latch component 24 installed within the receptacle 22 of the first latch component 16. The latch pin 62 in its extended state, as shown in FIG. 2, thus secures the two latch components 16 and 24 together to join the two belt portions 18 and 26.

However, when the sensor unit or component 12 is immersed in water, as when the motor vehicle is at least partially submerged, water enters the interior chamber 36 of the sensor body 28 through the water inlet passages 38 to dissolve and/or wash out the water soluble material 42 therein. When this material 42 is removed from the internal volume between the first end 30 and the head 44a of the pin 44 within the sensor body 28, the spring 46 extends to force the pin 44 into the penetrable seal in the end or mouth of the neck of the pressurized gas cartridge 40, generally as shown in FIG. 3. This allows the pressurized $CO_2$ or other gas within the cartridge to escape through the flexible pneumatic line 48 that connects the sensor 12 to the actuator 14. The gas cannot escape from the water inlet passages 38 through the wall 34 of the sensor body 28 because the head 44a of the pin 44 is pushed by the spring 46 to a position blocking the passages 38, as shown in FIG. 3.

As the gas flows through the line or tube 48 into the pneumatic chamber 70 of the actuator unit 14, the increasing pressure drives the sealing disc 68 toward the spring housing end 52 of the actuator 14, compressing the spring 72 therein. Since the sealing disc 68 is an integral and fixed component of the latch pin 62, the latch securing end 64 of the pin 62 travels with the disc 68, retracting from its normally extended position through the latch pin passages 58 and 76, respectively, of the first latch component 16 and second latch component 24. This allows the second latch component 24 to release from its position in the receptacle 22 of the first latch component 16, thus releasing the two belt portions 18 and 26 to allow an occupant restrained thereby to escape the vehicle. A supplemental spring may be placed at the bottom of the receptacle 22 of the first latch component 16 to eject the second latch component 24 therefrom, if desired, but the normal tension on the belt assembly as assisted by any retractors or tensioners in the system will normally provide sufficient tensile force on the belt system to separate the two belt components from one another when the latch pin 62 is withdrawn from the latch components 16 and 24.

While only a single belt release mechanism 10 is illustrated and described herein, it should be noted that most preferably one such system or mechanism is installed at each safety or seat belt position within the vehicle. It should also be noted that while only a single actuator is shown and described for the mechanism 10, additional actuators may be provided at various locations in order to assure belt release regardless of the orientation of the vehicle when it comes to rest in a body of water. For example, a second actuator (for each belt assembly) may be installed in or near the roof of the vehicle to actuate the belt release mechanism if the vehicle were to overturn in a relatively shallow body of water, e.g., submerging the inverted vehicle from roof to window line on the doors. A trapped occupant restrained by his or her belts in such a situation might drown if otherwise unable to escape by releasing his or her seatbelt assembly. Accordingly, such a system will provide a measure of safety not previously found in conventional motor vehicles.

It is to be understood that the present invention is not limited to the embodiment described above, but encompasses any and all embodiments within the scope of the following claims.

We claim:

1. A safety belt release mechanism, comprising:
   a first safety belt portion;
   a first latch component extending from the first safety belt portion;
   a second safety belt portion;
   a second latch component extending from the second safety belt portion, the first and second latch components being selectively and directly connected to one another, the first and second latch components each having a latch pin passage disposed therethrough, the latch pin passages being aligned concentrically with one another when the first and second latch components are connected to one another;
   an actuator unit attached to the first latch component; and
   an automated, water-activated sensor communicating pneumatically with the actuator unit, the actuator unit being selectively actuated by the sensor.

2. The safety belt release mechanism according to claim 1, wherein the sensor comprises:
   a sensor body having a first end, a second end opposite the first end, a wall defining an interior chamber between the first end and the second end, and at least one passage extending through the wall, the mechanism;
   a cartridge of pressurized gas extending from the first end of the sensor body, the cartridge selectively communicating pneumatically with the interior chamber of the sensor body;
   a water-soluble material disposed within the interior chamber of the sensor body, adjacent the first end thereof;
   a cartridge-penetrating pin disposed within the interior chamber of the sensor body, the water-soluble material being disposed between the pin and the first end of the sensor body;
   a spring disposed within the interior chamber of the sensor body adjacent the second end thereof, the spring urging the pin toward the cartridge; and
   a flexible pneumatic tube extending from the interior chamber of the sensor body to the actuator unit.

3. The safety belt release mechanism according to claim 1, wherein the actuator unit comprises:
   a latch attachment end, a spring housing end opposite the latch attachment end, and a wall defining an interior chamber between the latch attachment end and the spring housing end, the latch attachment end and the spring housing end each having a latch pin passage disposed concentrically therethrough;
   a latch pin extending concentrically through the latch pin passages of the actuator unit, the latch pin having a latch-securing end extending from the latch attachment end of the actuator unit, a guide end extending from the spring housing end of the actuator unit, and a sealing disc disposed generally medially thereon;
   a spring captured between the spring housing end of the actuator and the sealing disc of the latch pin, the spring urging the latch-securing end of the latch pin outwardly from the actuator unit;
   a pneumatic chamber disposed between the sealing disc of the latch pin and the latch attachment end of the actuator unit; and
   a flexible pneumatic tube extending between the pneumatic chamber of the actuator unit and the sensor.

4. The safety belt release mechanism according to claim 1, wherein the sensor further includes an interior chamber having a water-soluble material replaceably disposed therein.

5. The safety belt release mechanism according to claim 1, further including a cartridge of pressurized gas replaceably installed to the sensor and communicating pneumatically therewith.

6. The safety belt release mechanism according to claim 1, wherein:
   the first latch component includes a receptacle therein; and
   the second latch component comprises a tongue selectively latching in the receptacle of the first latch component.

7. A safety belt release mechanism, comprising:
   a sensor body having a first end, a second end opposite the first end, a wall defining an interior chamber between the first end and the second end, the wall having at least one passage extending therethrough;
   a cartridge of pressurized gas extending from the first end of the sensor body, the cartridge selectively communicating pneumatically with the interior chamber of the sensor body;
   a water-soluble material disposed within the interior chamber of the sensor body adjacent the first end thereof;
   a cartridge-penetrating pin disposed within the interior chamber of the sensor body, the water-soluble material being disposed between the pin and the first end of the sensor body;
   a spring disposed within the interior chamber of the sensor body adjacent the second end thereof, the spring urging the pin toward the cartridge;
   a safety belt latch assembly disposed remotely from the sensor body; and
   an actuator unit attached to the latch assembly, the actuator unit communicating pneumatically with the interior chamber of the sensor body, the actuator unit being selectively actuated by the sensor body.

8. The safety belt release mechanism according to claim 7, further including a first latch component and a second latch component, the first and second latch components selectively and directly connecting to one another to form the safety belt latch assembly, the first and second latch components each having a latch pin passage disposed therethrough, the latch pin passages being aligned concentrically with one another when the first and second latch components are connected to one another, the actuator unit being attached to the first latch component.

9. The safety belt release mechanism according to claim 8, wherein:
   the first latch component includes a receptacle therein; and
   the second latch component comprises a tongue selectively latching in the receptacle of the first latch component.

10. The safety belt release mechanism according to claim 7, wherein the actuator unit comprises:
    a latch attachment end, a spring housing end opposite the latch attachment end, and a wall defining an interior chamber between the latch attachment end and the spring housing end, the latch attachment end and the spring housing end each having a latch pin passage disposed concentrically therethrough;
    a latch pin extending concentrically through the latch pin passages of the actuator unit, the latch pin having a latch-securing end extending from the latch attachment end of the actuator unit, a guide end extending from the spring housing end of the actuator unit, and a sealing disc disposed generally medially thereon;
    a spring captured between the spring housing end of the actuator and the sealing disc of the latch pin, the spring urging the latch-securing end of the latch pin outwardly from the actuator unit;

a pneumatic chamber disposed between the sealing disc of the latch pin and the latch attachment end of the actuator unit; and a flexible pneumatic tube extending between the pneumatic chamber of the actuator unit and the sensor body.

11. A safety belt release mechanism, comprising:

a first latch component;

a second latch component selectively and directly connecting to the first latch component;

an automated actuator unit attached to the first latch component, the actuator unit having a latch attachment end, a spring housing end opposite the latch attachment end, and a wall defining an interior chamber between the latch attachment end and the spring housing end, the latch attachment end and the spring housing end each having a latch pin passage disposed concentrically therethrough;

a latch pin disposed concentrically through the latch pin passages of the actuator unit, the latch pin having a latch-securing end extending from the latch attachment end of the actuator unit, a guide end to extending from the spring housing end of the actuator unit, and a sealing disc disposed generally medially thereon;

a spring captured between the spring housing end of the actuator and the sealing disc of the latch pin, the spring urging the latch-securing end of the latch pin outwardly from the actuator unit;

a pneumatic chamber disposed between the sealing disc of the latch pin and the latch attachment end of the actuator unit; and an automated, water-activated sensor, the sensor communicating pneumatically with the actuator unit, the actuator unit being selectively actuated by the sensor.

12. The safety belt release mechanism according to claim 11, wherein the first and second latch components each have a latch pin passage disposed therethrough, the latch pin passages being aligned concentrically with one another when the first and second latch components are connected to one another.

13. The safety belt release mechanism according to claim 11, wherein the sensor comprises:

a sensor body having a first end, a second end opposite the first end, and a wall defining an interior chamber between the first end and the second end, the wall having at least one passage extending therethrough;

a cartridge of pressurized gas extending from the first end of the sensor body, the cartridge selectively communicating pneumatically with the interior chamber of the sensor body;

a water-soluble material disposed within the interior chamber of the sensor body adjacent the first end thereof;

a cartridge-penetrating pin disposed within the interior chamber of the sensor body, the water-soluble material being disposed between the pin and the first end of the sensor body;

a spring disposed within the interior chamber of the sensor body adjacent the second end thereof, the spring urging the pin toward the cartridge; and a flexible pneumatic tube extending from the interior chamber of the sensor body to the actuator unit.

14. The safety belt release mechanism according to claim 11, wherein the sensor further includes an interior chamber having a water-soluble material replaceably disposed therein.

15. The safety belt release mechanism according to claim 11, further including a cartridge of pressurized gas replaceably installed to the sensor and communicating pneumatically therewith.

16. The safety belt release mechanism according to claim 11, wherein:

the first latch component includes a receptacle therein; and the second latch component comprises a tongue selectively latching in the receptacle of the first latch component.

* * * * *